United States Patent
Brod et al.

(10) Patent No.: US 6,972,394 B2
(45) Date of Patent: Dec. 6, 2005

(54) METHOD FOR CONNECTING MICROCHIPS TO AN ANTENNA ARRANGED ON A SUPPORT STRIP FOR PRODUCING A TRANSPONDER

(75) Inventors: Volker Brod, Bad Abbach (DE); Ludger Overmeyer, Bordenau (DE)

(73) Assignee: Muehlbauer AG, Roding (DE)

( * ) Notice: Subject to any disclaimer, the term of this patent is extended or adjusted under 35 U.S.C. 154(b) by 155 days.

(21) Appl. No.: 10/473,697

(22) PCT Filed: Mar. 8, 2002

(86) PCT No.: PCT/EP02/02577

§ 371 (c)(1),
(2), (4) Date: Sep. 29, 2003

(87) PCT Pub. No.: WO02/089051

PCT Pub. Date: Nov. 7, 2002

(65) Prior Publication Data
US 2004/0089408 A1    May 13, 2004

(30) Foreign Application Priority Data
Apr. 25, 2001  (DE) ................................. 101 20 269

(51) Int. Cl.$^7$ ...................... B23K 1/005; G01K 19/077
(52) U.S. Cl. ................. 219/121.85; 156/230; 156/235; 156/239; 219/85.13
(58) Field of Search ............................. 156/230, 235, 156/239; 219/85.13, 121.85, 86.13, 230, 219/236, 239

(56) References Cited

U.S. PATENT DOCUMENTS

| | | | |
|---|---|---|---|
| 4,414,444 A | * | 11/1983 | Schneider ............... 219/121.85 |
| 5,470,411 A | | 11/1995 | Gloton et al. |
| 5,867,102 A | * | 2/1999 | Souder et al. ........... 340/572.8 |
| 5,902,437 A | * | 5/1999 | McDonough et al. ....... 156/234 |
| 6,214,444 B1 | * | 4/2001 | Uchibori ..................... 428/209 |
| 6,334,921 B1 | * | 1/2002 | Duschek ..................... 156/230 |
| 6,827,817 B2 | * | 12/2004 | Bleckmann et al. ........ 156/73.1 |

FOREIGN PATENT DOCUMENTS

| | | |
|---|---|---|
| DE | 197 09 985 A1 | 3/1997 |
| DE | 199 12 201 A1 | 3/1999 |
| DE | 199 15 765 A1 | 4/1999 |
| DE | 199 16 781 A1 | 4/1999 |
| EP | 0 952 543 A1 | 10/1999 |
| FR | 2 795 203 | 12/2000 |
| WO | WO 98/14904 | 4/1998 |

* cited by examiner

Primary Examiner—Geoffrey S. Evans
(74) Attorney, Agent, or Firm—Boyle Fredrickson Newholm Stein & Gratz S.C.

(57) ABSTRACT

The invention relates to a method of connecting micro-chip modules to antennas arranged on a first carrier tape for the manufacture of transponders. The method is characterised in that the micro-chips are packaged in a preceding bonding process to form a chip module with electrical terminals and are applied to a second carrier tape. The two carrier tapes are wound off a reel and brought one above the other, whereby the chip modules are removed from the second carrier tape and placed at a predetermined point on the first carrier tape. This method facilitates a continuous manufacturing process which is particularly economical and particularly fast.

12 Claims, 2 Drawing Sheets

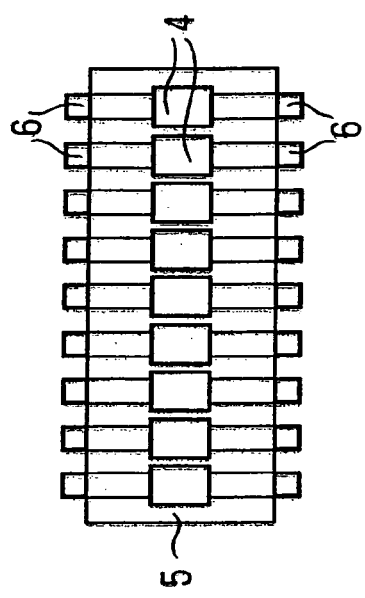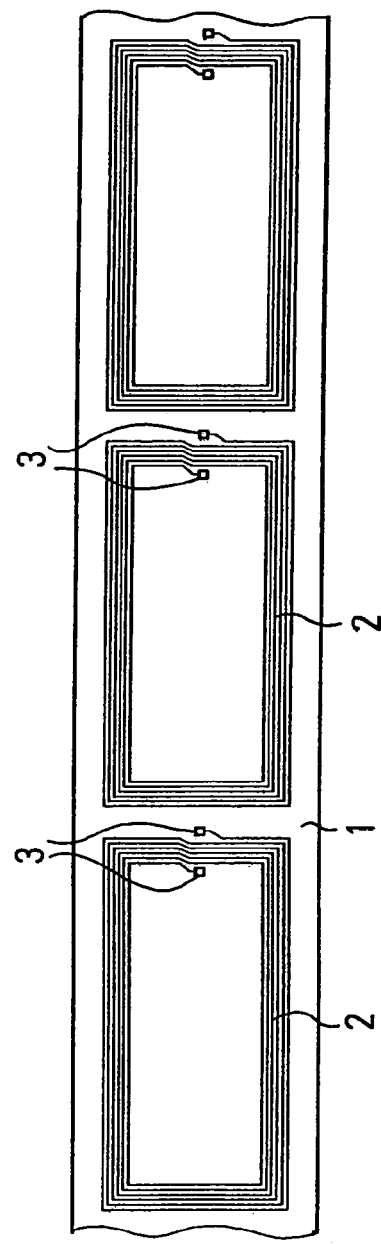
FIG.1
FIG.2

METHOD FOR CONNECTING MICROCHIPS TO AN ANTENNA ARRANGED ON A SUPPORT STRIP FOR PRODUCING A TRANSPONDER

BACKGROUND OF THE INVENTION

1. Field of the Invention

The invention relates to a method of connecting micro-chips to antennas arranged on a first carrier tape for the manufacture of a transponder.

2. Description of the Related Art

This type of transponder, which, for example, are used for smart labels or smart cards, exhibit a flat antenna coil, which is fitted with two connections. The antennas can be manufactured from various materials, such as, for example, copper, aluminium, silver conducting paste, etc. The size of the antennas can vary depending on the application. With currently employed manufacturing methods the flat antenna coils are applied to a carrier tape which is wound onto a reel. Up to the present time, the micro-chips have been connected to the antennas on the carder tape through a complex bonding process. This requires that the carrier tape exhibiting the antennas passes via an indexer and is at standstill during the bonding process. Apart from the fact that the bonding process demands complicated machines and extremely precise operation, the bonding process currently takes up to 15 seconds. This relatively high time requirement is in conflict with the economical manufacture of the transponders. A method of manufacturing transponders is, for example, described in DE-A 199 15 765, in which semiconductor chips and the antenna are applied to the flat side of a thermoplastic foil, whereby the foil is connected to an endless foil tape. It is also known from DE-A 199 16 781 how to apply single chips to sheets of laminate.

OBJECTS AND SUMMARY OF THE INVENTION

The object of this invention is to further develop a method of the type mentioned at the beginning which enables transponders to be manufactured more simply, faster and, above all, more economically.

This object is solved according to the invention in that the micro-chips are packaged in a chip module with electrical connections in a preceding bonding process and applied to a second carrier tape such that the two carrier tapes are unwound from the reel and brought one over the other, whereby the chip modules are taken from the second carrier tape and placed at a predetermined position on the first carrier tape, whereby also the tape speed of the second carrier tape is, at least at the time of placement of the chip module, adapted to the tape speed of the first carrier tape.

Shifting the bonding process to a preceding process has the advantage that the chip module produced in this manner can be applied substantially quicker and easier to the first carrier tape fitted with the antennas. It is possible to solder or crimp the chip module to the antenna which, on one hand, is substantially quicker and, on the other hand, demands less precision than a bonding process. With the method according to the invention, the manufacturing speed can be further increased in that both carrier tapes are unwound from the reel and brought one over the other and at the time of placement of the chip module on the first carrier tape, the speeds of both carrier tapes are adjusted. Consequently, it is not necessary that the carrier tapes are at standstill when the chip module is connected to an antenna. The process can therefore run continuously, resulting in a significant increase in the manufacturing speed. In this case it is not that the preceding bond process leads to an overall slowing down of the manufacturing process at another point. It is rather that the packaging of the micro-chip into a chip module within the framework of a preceding bonding process is substantially easier to implement than the bonding of a micro-chip to an antenna. Furthermore, the packaging of the micro-chip into a chip module can occur at a central point, for example, at the chip manufacturer's premises, so that the procurement by the transponder manufacturer of an expensive bonder requiring highly qualified operating personnel is not needed.

According to a preferred embodiment the first carrier tape carrying the antennas runs at a continuous speed, whereas the second carrier tape runs synchronously with the passing antenna spacing via an index marking which is guided in the first carrier tape. Here, the second carrier tape is briefly accelerated to the tape speed of the first carrier tape for the placement of the chip module on the first carrier tape. The chip module, placed at the correct point in this manner, can be electrically connected to the appropriate antenna by soldering or crimping immediately after placement onto the first carrier tape. Immediately after the connection of the chip module, the transponder manufactured in this manner can be tested using the normal methods.

A particularly preferred method is when the chip module, during placement on the first carrier tape, is held on the first carrier tape by an endlessly circulating transport tape, running at the same speed as the first carrier tape, until the chip module is firmly connected to the appropriate antenna. The transport tape in effect accepts the chip module supplied by the second carrier tape and ensures that the chip module is held at the correct position in relation to the antenna during the progression of the first carrier tape.

It is advantageous if the soldering of the chip module to the antenna occurs using a laser beam.

Once finished, the transponders manufactured in this way can be rolled up again with the first carrier tape after any necessary testing stage.

BRIEF DESCRIPTION OF THE DRAWINGS

In the following the invention is explained in more detail based on a drawing and using examples. The following are shown:

FIG. 1 shows a first carrier tape carrying antennas;

FIG. 2 shows a second carrier tape fitted with chip modules;

DETAILED DESCRIPTION OF THE PREFERRED EMBODIMENTS

Figure 3:
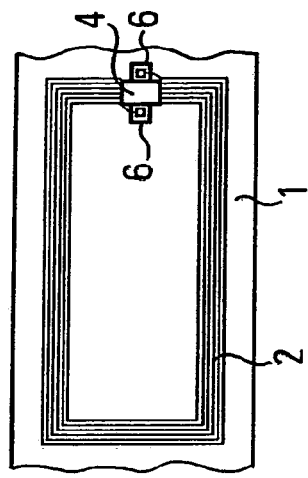
FIG. 3 shows a first carrier tape from FIG. 1 with chip modules placed and connected to the antenna terminals.

FIG. 1 shows a first carrier tape 1 onto which coils 2 have been applied as antennas. Here, antennas manufactured by electroplated deposition are involved. The coils 2 exhibit two terminals 3 for a chip module.

These chip modules 4 are shown in FIG. 2. They are held closely one behind the other on a second carrier tape 5. The chip modules are packaged by a preceding bonding process into a chip case shown in FIG. 2. This case exhibits two galvanised terminal pads 6, the spacing of which corresponds to the terminals of the rectangular coils 2.

FIG. 3 shows a carrier tape 1 with a rectangular coil 2 which has already been complemented with a chip module 4. The chip module 4 has been soldered to the terminals 3 through its terminal pads 6.

Figure 4:
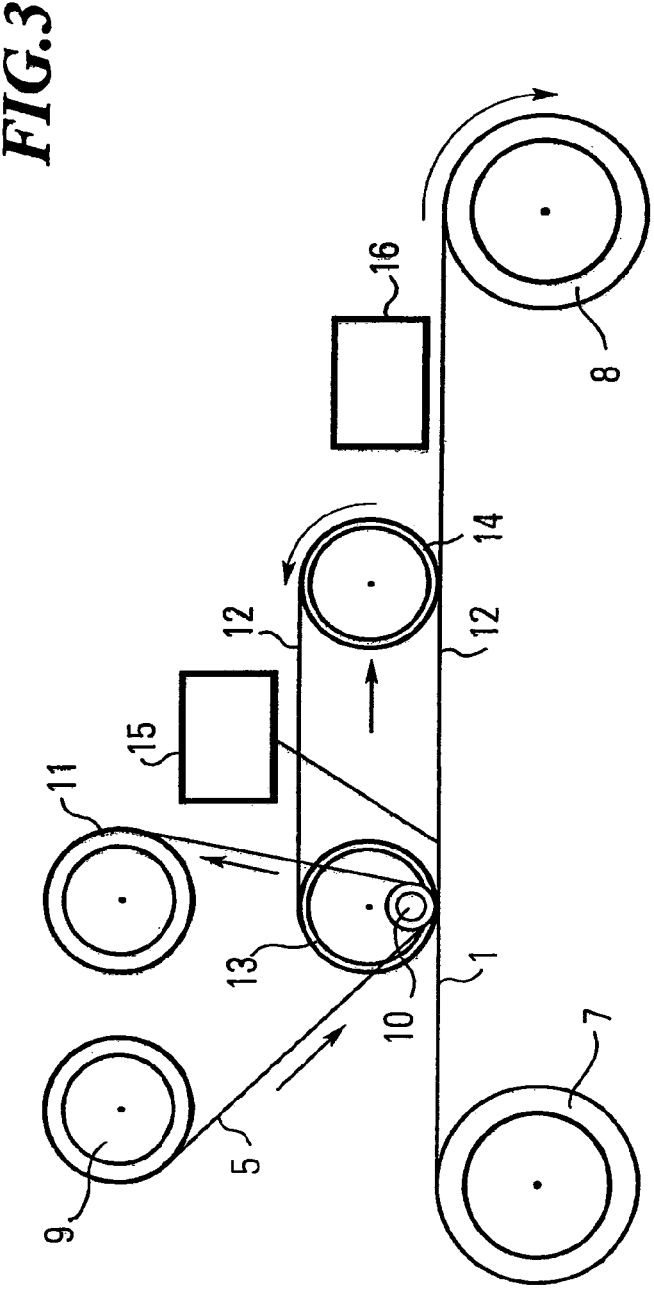
FIG. 4 shows a schematic representation of a device for connecting the chip modules of the second carrier tape to the antennas of the first carrier tape.

In the following the manufacturing method is explained in more detail based on FIG. 4.

The first carrier tape 1 is rolled onto an input spool 7 and is unrolled from it and wound onto a finish spool 8 after the connection process.

The second carrier tape 5 which carries the chip modules 4 is wound from a spool 9 for chip modules, diverted around a diversion roller 10 and wound up onto a residual tape spool 11.

At the height of the diversion roller 10 a circulating transport tape 12 begins, or more precisely, the first diversion roller 13 of the transport tape 12. The transport tape 12 extends above the first carrier tape 1 to a drive roller 14. A laser solder unit 15 is provided between the diversion roller 13 and the drive roller 14. A test chip module 16 is provided behind the drive roller 14. The device functions as follows:

The first carrier tape 1 is drawn off with a continuous speed from the input spool 7 and wound onto the finish spool 8. The second carrier tape 5 carrying the chip modules 4 is drawn off in an indexed manner from the spool 9 in synchronism with the antenna spacing on the first carrier tape 1 and passed around the diversion roller 10. At the diversion roller 10 the chip modules 4 are released, for example, by heating the carrier tape 5. On the release of the chip module 4 it is taken up both by the first carrier tape 1 and the transport tape 12 which is circulating at the same speed as the first carrier tape 1. The chip module is here placed with its terminal pads 6 precisely on the terminals 3 of the rectangular coil 2. The transport tape 12 brings the chip module 4 to this position while it continues to move at the same speed as the first carrier tape 1. While this is happening, the terminal pads 6 are soldered to the terminals 3 with the aid of the laser solder unit 15, whereby the laser beam also moves at the tape speed of the carrier tape 1. The transponders, complemented in this manner, are tested with the aid of the test chip module 16 arranged behind the transport tape 12 and thereafter the first carrier tape can be wound up onto the finish spool. The finish spool therefore holds transponders which have already been complemented and tested. With the chip modules used here RFID (Radio Frequency Identification) chip modules are involved. These are modules which can be produced especially flat and which are especially suitable together with the flat-coil antennas for smart label applications. Smart labels are labels containing the transponders just described and which can be stuck to any products or components to provide identification.

Instead of the laser soldering, it is also possible to crimp the terminal pads 6 on the chip modules 4 to the terminals 3 on the rectangular coils 2.

What is claimed is:

1. A method of connecting micro-chips to antennas arranged on a first carrier tape for the manufacture of a transponder, wherein the micro-chips are packaged in a preceding bonding process to form a chip module with electrical terminals and are applied to a second carrier tape, and wherein the two carrier tapes are unwound from a reel and brought one above the other, whereby the chip modules are removed from the second carrier tape and placed at a predetermined point on the first carrier tape.

2. A method according to claim 1, wherein the first carrier tape runs at a continuous speed while the second carrier tape is fed to the first carrier tape in synchronism with the passing antenna spaces via an indexer.

3. A method according to claim 1, wherein the chip module is electrically connected to the appropriate antenna by soldering or crimping immediately after placement on the first carrier tape.

4. A method according to claim 1, wherein the transponder is tested immediately after the connection of the chip module to the antenna.

5. A method according to claim 1, wherein the chip module is held by a transport tape, circulating endlessly at the same speed as the first carrier tape, on the first carrier tape during the placement onto the first carrier tape until the chip module is firmly connected to the appropriate antenna.

6. A method according to claim 1, wherein the electrical connection of the chip module to the antenna occurs by laser soldering.

7. A method of connecting micro-chips to antennas as part of the manufacture of transponders, the micro-chips having been packaged in a preceding bonding process to form chip modules with electrical terminals, the method comprising the steps of:

providing first and second carrier tapes, each of which is wound onto a reel, the first carrier tape bearing the antennas, and the second carrier tape bearing the chip modules, unwinding the first and second carrier tapes, bringing one carrier tape above the other, removing the chip modules from the second carrier tape, placing the chip modules at a predetermined point on the first carrier tape, and electrically connecting each chip module to a corresponding antenna.

8. A method according to claim 7, wherein, during the unwinding process, the first carrier tape runs at a continuous speed while the second carrier tape is fed to the first carrier tape in synchronism with the passing antenna spaces via operation of an indexer.

9. A method according to claim 7, wherein the electrically connecting step comprises, for each chip module, soldering or crimping the terminals of the chip module to the corresponding antenna immediately after placing the chip module on the first carrier tape.

10. A method according to claim 7, further comprising testing each transponder immediately after connecting the corresponding chip module to the corresponding antenna.

11. A method according to claim 7, wherein the removing step includes holding the chip module on the first carrier tape by a transport tape until the chip module is firmly connected to the corresponding antenna, the transport tape circulating endlessly at the same speed as the first carrier tape.

12. A method according to claim 7, wherein the electrically connecting step comprises, for each chip module, laser soldering the terminals of the chip module to the corresponding antenna.

* * * * *